Dec. 23, 1947.　　　J. A. GRANT　　　2,433,271
METHOD OF FORMING PARALLEL GLASS FIBER FILTER UNITS
Filed May 13, 1944　　　4 Sheets-Sheet 1
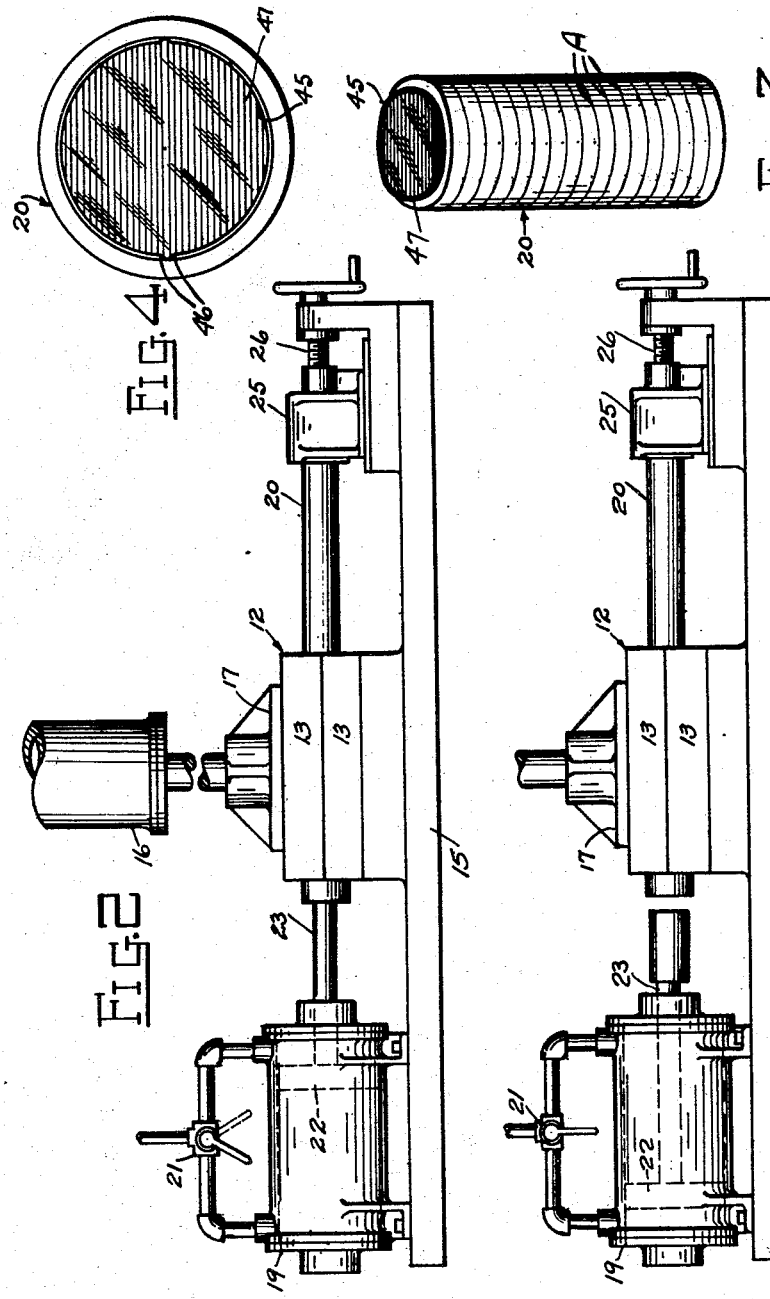
INVENTOR
John A. Grant
BY
ATTORNEYS

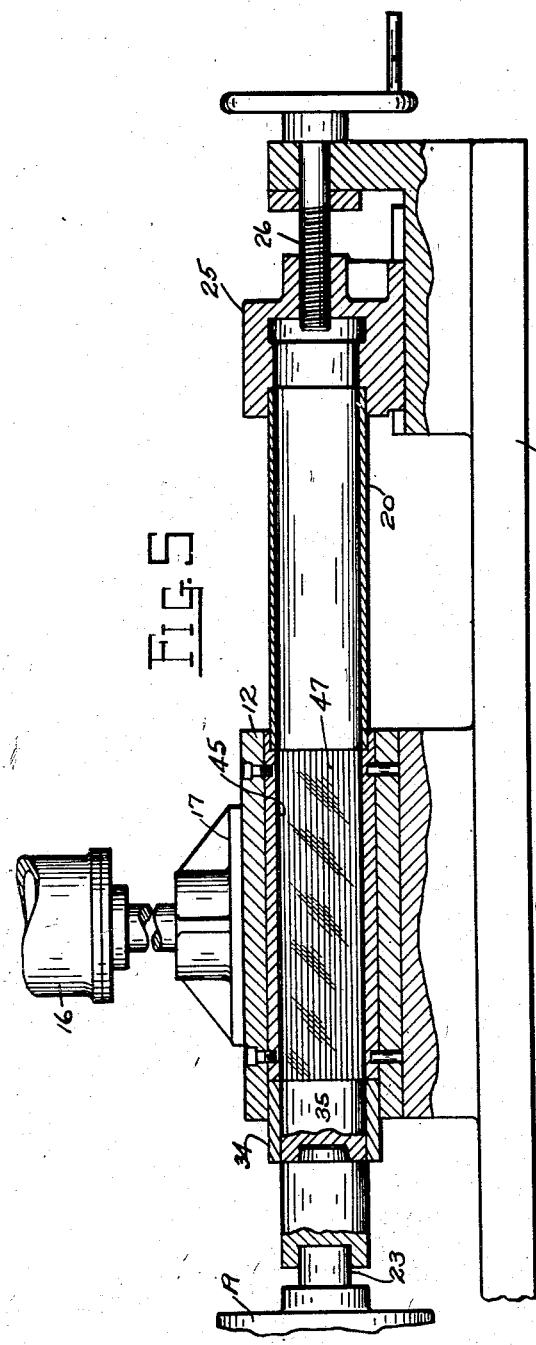
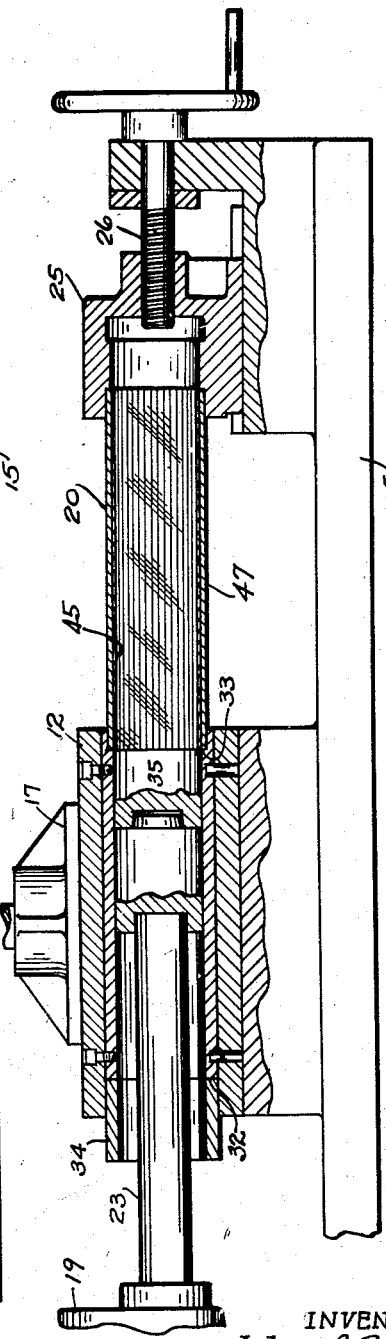

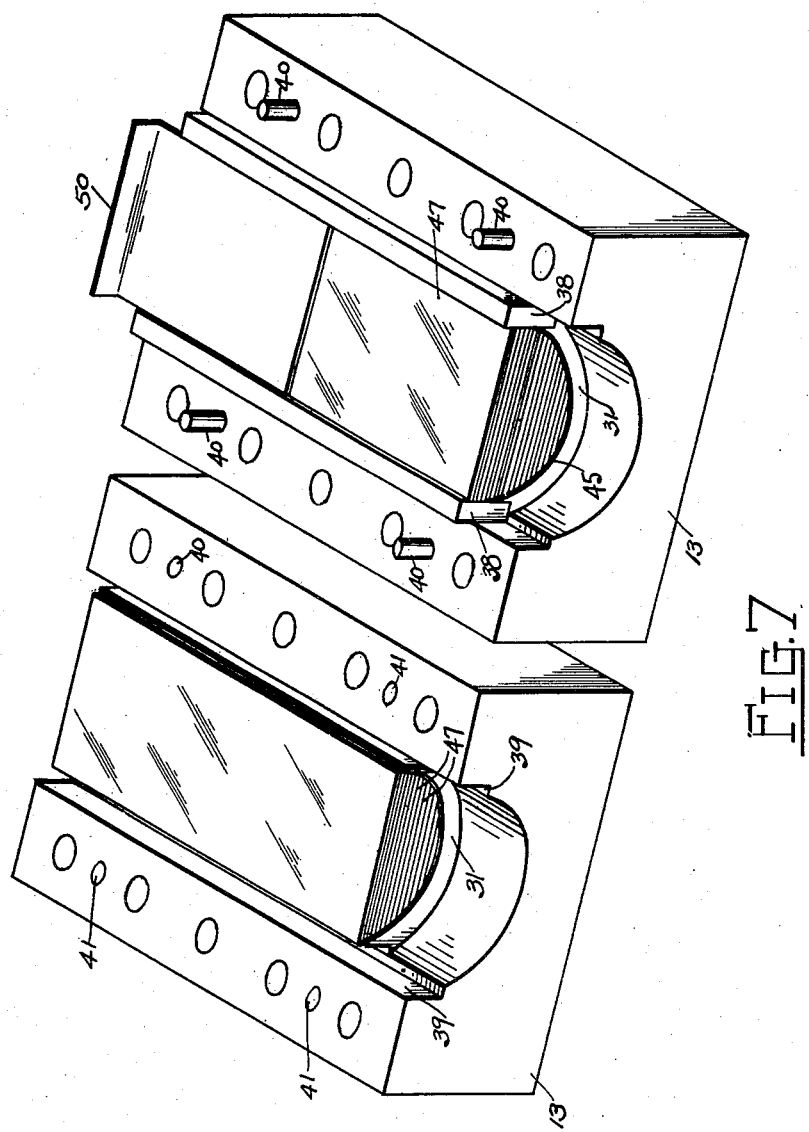

Dec. 23, 1947.     J. A. GRANT     2,433,271
METHOD OF FORMING PARALLEL GLASS FIBER FILTER UNITS
Filed May 13, 1944     4 Sheets-Sheet 4

INVENTOR.
John A. Grant
BY
ATTORNEYS

Patented Dec. 23, 1947

2,433,271

UNITED STATES PATENT OFFICE 2,433,271

METHOD OF FORMING PARALLEL GLASS FIBER FILTER UNITS

John A. Grant, Granville, Ohio, assignor to Owens-Corning Fiberglas Corporation, a corporation of Delaware Application May 13, 1944, Serial No. 535,518

3 Claims. (Cl. 29—148)

The present invention relates to parallel fiber products and their manufacture. It particularly relates to a method of producing parallel fiber units for use as filters or for other purposes, and finds especial application in the production of filters or other units made of glass fibers.

In parallel fiber filters, a plurality of fibers usually circular in cross-section, are fagotted to form a bundle wherein the fibers are substantially in longitudinal contact and extend in the direction of flow of the filtrate. The filter interstices are formed by the spaces between the fibers at the sides of the longitudinal lines of contact between adjoining fibers. The fibers are maintained in compact relation by suitable means, for example, a band or frame of suitable material that encloses the bundle. Filters of this general type are shown, for instance, in the Swiss Patent No. 129,574 of 1929, United States Patent No. 1,885,762 to Polushkin of November 1, 1929, and the Simison Patents No. 2,311,704 and No. 2,328,302. In these filters compact arrangement of the fibers in parallelism with substantially all of the fibers in longitudinal contact is highly desirable. This arrangement of the fibers provides a multiplicity of substantially uniform spaces between the fibers to form the filtrate passages and aid in maintaining the individual fibers in place in the unit.

Difficulties have been encountered in prior attempts to obtain this compact parallel arrangement of glass fibers. If a bundle of glass fibers in which the fibers extend generally in the direction of length of the bundle is subjected to transversely applied pressure, the relatively high friction existing between the surfaces of the glass fibers makes it difficult to obtain movement of the fibers, one over the other, and the relatively incompressible nature of such fibers will not allow cross-sectional deformation thereof to assist in obtaining compact relation. This usually occurs when a relatively loose bundle of fibers are combed or otherwise treated to achieve complete parallelarity.

It is the usual practice in the manufacture of filters of this type to enclose the bundled fibers in a retaining shell such as a tube into which the bare fibers are extruded under high pressure or by surrounding the bundle with a sheet of material and welding the edges thereof together. The former extrusion method rendered the manufacture of filter units extremely difficult due to the high degree of friction developed between the fibers and the wall of the shell. This abrasion caused destruction and breaking of the fibers around the edge of the mass and the broken fibers tended to sift out of the completed filter. In filter units of the welded type great care must be taken in order that handling of the fibers does not disturb their parallel arrangement. Placing the fibers under sufficient compression to hold them in compact relation is another difficulty encountered in this method.

In view of the foregoing it is the primary object of the invention to provide a method of and apparatus for making glass fiber filter units in which the glass fibers are rigidly and securely held in compact parallel relation.

In order to facilitate the handling and assembly of fine glass fibers for filter units of the present class a lubricant is usually applied to the fibers. This serves as an aid in assembling the fibers and maintaining them in parallelism as well as creating a tendency for the fibers to adhere to one another. A suitable lubricant may be a light mineral oil which can be flushed out or otherwise removed after assembly. One lubricant which I have found successful under the present method is Stoddard's solvent, but other liquids such as toluol or kerosene may also be employed to good advantage. The surface tension of the fluid coating the fibers acts as an adhesive for temporarily holding the bundled fibers together.

It is another object of the invention to form a glass fiber unit by employing fibers which are disposed in prearranged relation to maintain them in parallelism prior to and during assembly of the unit.

As a result of prior attempts to extrude bundled fibers into a tubular retaining member the high degree of friction developed between the fibers and the wall of the tube caused objectionable destruction of the fibers. It is another important object of the invention to overcome the foregoing difficulties by providing means whereby the body of fibers may be readily placed within a support by reducing the degree of friction formerly encountered, this reduction of friction being accomplished by preventing contact of the fibers with the tube.

It is a further object of the invention to provide an apparatus for simply and economically producing glass fiber filter units.

Other objects will be made more apparent as the description proceeds, especially when considered in connection with the drawings, in which:

Figure 1 is a side elevational view conventionally illustrated, of one form of apparatus suitable for practicing the present invention, and shown in starting position;

Figure 2 is a similar view of the apparatus shown in operating position;

Figure 3 is a perspective view of a completed glass fiber unit such as produced by the present apparatus;

Figure 4 is a plan view of a completed filter unit;

Figure 5 is a longitudinal sectional view through the apparatus illustrating a preliminary position;

Figure 6 is a similar view illustrating the completed forming operation;

Figure 7 is a perspective view of the fiber mold sections shown in loading position;

Generally, the glass fibers may be produced in any suitable manner, but it has been found more advantageous to form the fibers by mechanically attenuating them from the supply body of molten glass and collecting them on a drum in parallel arrangement. The body of formed fibers may then be cut transversely along a line parallel with the axis of the drum and then removed and flattened out to form a sheet. The sheet thus formed may be of any but preferably a thickness which may be easily and readily handled without disturbing the parallel arrangement of the fibers.

Figure 8:
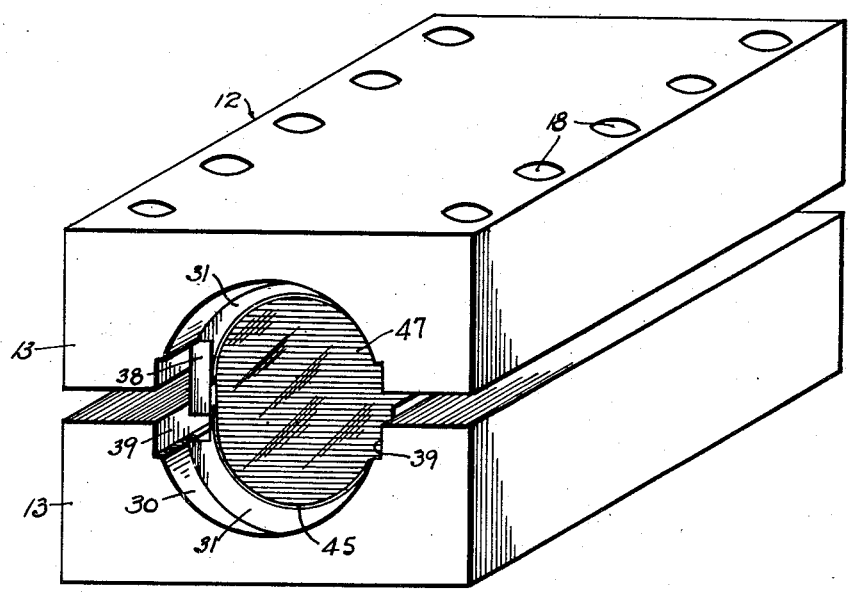
Figure 8 is a perspective view of the fiber mold shown in partially closed relation.
Figure 9:
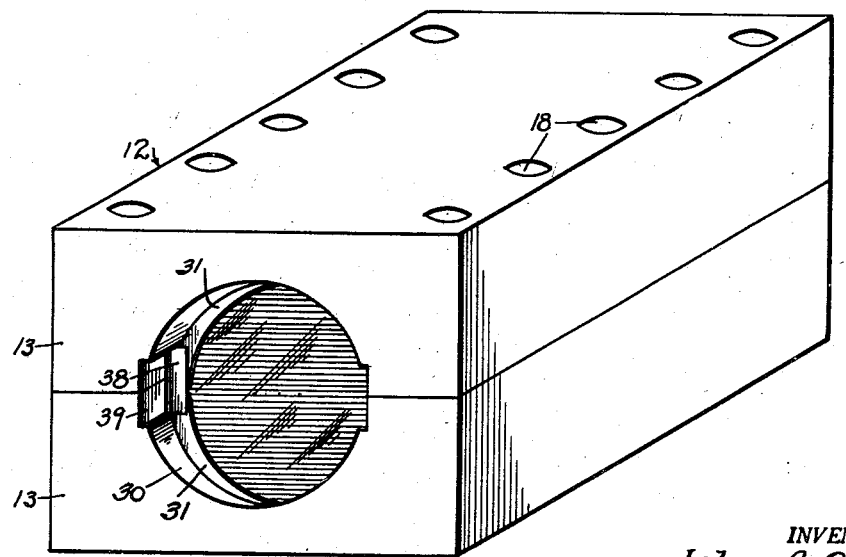
Figure 9 is a similar view of the mold in assembled position.

Referring to the accompanying drawings and Figures 1 and 2 in particular, the apparatus includes generally a fiber supporting mold 12 having separable complementary half-sections 13 (Figures 7, 8 and 9). In operation, to be described in detail presently, the prepared glass fibers are placed within the mold and the sections brought together to compact the fibers therein. This latter is accomplished by placing the mold on a base 15 in operative relation with an air operated motor 16 having a pressure plate 17 secured thereto for engaging the mold and bringing the sections together under pressure.

As an alternate method of closing the mold under pressure, holes 18 are provided along each longitudinal edge so that bolts (not shown) may be placed therethrough for drawing the mold halves together.

An air operated motor 19 also mounted on the base 15 is adapted to move the compacted fibers from the mold 12 into a retainer tube 20 as will be brought out presently. The motor 19 is under the control of a three way valve 21 for moving the piston 22 of the motor 19 and piston rod 23 connected thereto into and out of operating position with the mold 12.

As indicated in Figures 5 and 6, the retainer tube 20 is supported at one end within the mold 12 and at its other end by a block 25 adjustably mounted on the base 15 and movable under control of a threaded screw 26. The block further provides a bearing to absorb the extruding pressure necessary for moving the fibers into the tube 20 as will be explained in detail presently.

As previously mentioned, the fiber supporting mold 12 comprises complementary half-sections 13 each of which is provided with a semi-cylindrical channel 30 adapted when placed together as shown in Figure 9 to form a cylindrical bore extending through the mold. Liner supporting half-sections 31 secured within the mold sections 13 are of less length than the mold and provide shoulders 32 and 33 within either end of the bore. The shoulder 32 forms a recess for receiving a sleeve 34 (Figure 5) which serves as a guide for an extruding head 35 carried by the piston rod 23 of the motor 19, and the shoulder 33 is adapted to support the inner end of the retaining tube 20 in alignment with the bore of the mold.

One of said liner supporting half-sections 31 is provided with a pair of parallel oppositely arranged guide bars 38 disposed parallel with and tangentially of the bore and extending transversely on either side of the mold parting line. The bars serve as an aid in loading the mold with fibers. The other of said mold sections 13 is provided with channels 39 (see Figure 7) adapted to receive the bars 38 and guide the mold sections into proper and matching relation. Dowel pins 40 fixed to one of the mold sections 13 are adapted to enter holes 41 in the other of said sections and thus preserve longitudinal alignment of the mold sections when the halves are placed together.

In order to facilitate assembly of a glass fiber unit of the present type, I provide a liner 45 or shell of relatively thin sheet metal and equally divided longitudinally to form a pair of complementary half-sections. The meeting edges of the liner sections 45 are beveled as at 46 (Figure 4) and provide knife-like edges which lie adjacent the bars 38 so that when the filled mold halves are brought together the fibers are forced inwardly away from the bars.

When it is desired to form a glass fiber unit in accordance with the present invention, the mold sections 13 are preferably placed side by side and a liner section 45 placed in position in each. Previously prepared sheets 47 of coated glass fibers in parallel relation and of proper width are carefully placed therein until each mold section is slightly over-filled. This over-filling results finally in compacting the fibers and expelling any air and/or excess lubricant therefrom as well as placing the fibers in the finished unit under compression.

Placing the filled mold halves together is aided by the use of a sheet metal plate 50 (Figure 7) for holding the sheets of fibers securely within the mold half while it is inverted and placed in position over the other mold section. The bars 38 enter the channels 39 in the relative position shown in Figure 8 to completely enclose the fibers longitudinally. The plate 50 may then be withdrawn without disturbing the conformation of the fiber pack.

The assembled mold may then be placed on the base 15 beneath the air motor 16 and the motor operated to apply compression to the mold through the plate 17. This action brings the mold sections together as shown in Figure 9 and places the body of fibers under a relatively high degree of compression. The edges 46 of the lowermost liner 45 moves across the face of the bar 38 as the mold sections are brought together so that any fibers loosened from the edge of the pack during handling are scraped from the bar and brought into proper relation.

As illustrated in Figures 5 and 6, the guide sleeve 34 is placed in the recess 33 in the mold and the extruding head placed therein. Upon operation of the valve 21 the head 35 which is substantially the same diameter as the liner, under the influence of the motor 19 forces the liner 45 and the enclosed fibers forwardly into the tube 20. The diameter of the compressed liner and fiber pack is such that it results in a force fit with the tube 20 so that the fibers in the finished product are held firmly against displacement. A lubricant may be applied to the liner 45 to reduce the friction between the liner and the tube during extrusion and thus reduce the force necessary for completing the operation.

By employing a liner for enclosing the fibers in the above manner the fibers themselves are not subjected to the effect of friction during extrusion or fabricating operations. Accidental disarrangement or breaking of the very fine fibers (which are sometimes as small as .0002 inch in diameter) particularly at or around the periphery of the mass is thus prevented.

Figure 3 illustrates a completely assembled glass fiber unit after removal from the forming apparatus, the lines A shown thereon being for the purpose of indicating where the unit may be sawed or otherwise cut to produce wafer-like sections adapted to form filter units.

Various modifications may be made within the spirit of the invention and the scope of the claims.

I claim:
1. The method of forming a parallel glass fiber filter unit which consists in partially enclosing bundles of glass fibers in complementary semicircularly shaped thin sheets of material in mold sections, covering one of said bundles, holding the covered bundle of fibers securely within the mold section while it is inverted and placed in position over the other mold section, removing the cover and uniting said bundles, applying pressure to the mold to cause the edges of said sheets of material to meet and form a single unit therefrom, moving said unit from the mold while under compression, and permanently enclosing said unit.

2. The method of forming a parallel glass fiber filter unit which consists in partially enclosing bundles of glass fibers in complementary semicircularly shaped thin sheets of material having their side edges beveled and arranged in mold sections, covering one of said bundles, holding the bundle of fibers securely within the mold section while it is inverted and placed in position over the other mold section, removing the cover and uniting said bundles, applying pressure to the mold to cause the beveled edges of said sheets of material to meet and form a single circular unit therefrom, moving said unit from the mold while under compression, and permanently enclosing and supporting said unit while maintaining pressure thereon.

3. The method of forming a parallel glass fiber filter unit which consists in partially enclosing bundles of glass fibers in complementary semicircularly shaped thin sheets of material in mold sections, covering one of said bundles, holding the bundle of fibers securely within the mold section while it is inverted and placed in position over the other mold section, removing the cover and uniting said bundles, applying pressure to the mold to cause the edges of said sheets of material to meet and form a single circular unit therefrom, moving said unit from the mold while under compression, permanently enclosing and supporting said unit while maintaining pressure thereon, and dividing said unit into individual wafers.

JOHN A. GRANT.

REFERENCES CITED

The following references are of record in the file of this patent:

UNITED STATES PATENTS

| Number | Name | Date |
|---|---|---|
| 577,015 | Eshman | Feb. 16, 1897 |
| 1,247,667 | Gilmore | Nov. 27, 1917 |
| 1,386,003 | Kempton | Aug. 2, 1921 |
| 1,644,801 | Van Der Werff | Oct. 11, 1927 |
| 1,827,233 | Hughes | Oct. 13, 1931 |
| 1,827,267 | Short | Oct. 13, 1931 |
| 1,885,762 | Polushkin | Nov. 1, 1932 |
| 1,959,254 | Zerk | May 15, 1934 |
| 2,008,772 | Robertson | July 23, 1935 |
| 2,054,809 | Fleisher | Sept. 22, 1936 |
| 2,076,389 | Voss | Apr. 6, 1937 |
| 2,095,539 | Bichowsky | Oct. 12, 1937 |
| 2,311,704 | Simison | Feb. 23, 1943 |
| 2,324,083 | Holmes | July 13, 1943 |
| 2,354,931 | Tolman | Aug. 1, 1944 |

FOREIGN PATENTS

| Number | Country | Date |
|---|---|---|
| 528,043 | Great Britain | Oct. 22, 1940 |